United States Patent
Hung et al.

(10) Patent No.: US 11,941,157 B2
(45) Date of Patent: Mar. 26, 2024

(54) COMPUTER ANALYSIS OF SOFTWARE PERMISSIONS FOR PROTECTING ACCESS TO DATA

(71) Applicant: INTERNATIONAL BUSINESS MACHINES CORPORATION, Armonk, NY (US)

(72) Inventors: Hao Chun Hung, Taipei (TW); Po-Cheng Chiu, Taipei (TW); Tsai-Hsuan Hsieh, Taoyuan (TW); Cheng-Lun Yang, Taipei (TW); Chiwen Chang, Taipei (TW); Shin Yu Wey, Taipei (TW)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 275 days.

(21) Appl. No.: 17/123,887

(22) Filed: Dec. 16, 2020

(65) Prior Publication Data
US 2022/0188433 A1   Jun. 16, 2022

(51) Int. Cl.
*G06F 21/51* (2013.01)
*G06F 16/951* (2019.01)
*G06F 21/62* (2013.01)

(52) U.S. Cl.
CPC .......... *G06F 21/629* (2013.01); *G06F 16/951* (2019.01); *G06F 21/51* (2013.01); *G06Q 50/40* (2024.01)

(58) Field of Classification Search
CPC ...... G06F 21/629; G06F 16/951; G06F 21/51; G06Q 50/30
See application file for complete search history.

(56) References Cited

U.S. PATENT DOCUMENTS 10,397,630 B2 *   8/2019   Ju ................. H04N 21/85406
2002/0184486 A1 *  12/2002   Kershenbaum ......... G06F 9/468
                                                    713/150
(Continued)

FOREIGN PATENT DOCUMENTS

CN         103440140 A      12/2013

OTHER PUBLICATIONS

Hayes, D., Snow, C., & Altuwayjiri, S. (2018). A dynamic and static analysis of the Uber mobile application from a privacy perspective. Journal of information systems applied research, 11(1), 11 (Year: 2018).*

(Continued)

*Primary Examiner* — Catherine Thiaw
(74) *Attorney, Agent, or Firm* — Tutunjian & Bitetto, P.C.; Michael A. Petrocelli

(57) ABSTRACT

A computer implemented method for managing the scope of permissions granted by users to application that includes collecting a set of permissions for an application from an application provider publication; and collecting a process flow for functional steps of the application from a review of the application that is published on a product review type publication. The computer implemented method further includes dividing the functional steps of the application into a plurality of journeys, each of said plurality of journeys having a function associated with a stage of a functional step from a perspective of a user; and matching permissions from the set of permissions for each journey of said plurality of journeys to provide matched permissible permissions to journeys stored in a customer journey store.

14 Claims, 8 Drawing Sheets

(56) References Cited

U.S. PATENT DOCUMENTS

| | | | | |
|---|---|---|---|---|
| 2014/0188897 A1* | 7/2014 | Baker | ............... | G06F 16/24578 |
| | | | | 707/758 |
| 2016/0357794 A1* | 12/2016 | Liang | ................. | G06F 16/9535 |
| 2017/0061136 A1 | 3/2017 | Fung et al. | | |
| 2020/0134679 A1* | 4/2020 | Lewis | ................ | G06Q 30/0278 |
| 2021/0390171 A1* | 12/2021 | Yuan | ........................ | G06F 9/451 |
| 2022/0229700 A1* | 7/2022 | Goebel | ................... | H04L 63/04 |

OTHER PUBLICATIONS

Pandita, R., Xiao, X., Yang, W., Enck, W., & Xie, T. (2013). {Whyper}: Towards automating risk assessment of mobile applications. In 22nd USENIX Security Symposium (USENIX Security 13) (pp. 527-542) (Year: 2013).*

Peiravian N, Zhu X. Machine learning for android malware detection using permission and api calls. In 2013 IEEE 25th international conference on tools with artificial intelligence Nov. 4, 2013 (pp. 300-305). IEEE. (Year: 2013).*

Dhillon et al., "Intelligent and Dynamic Permission Model for User Permissions", Technical Disclosure Commons, Defensive Publications Series. Oct. 1, 2018. pp. 1-9.

Gasparis et al., "Figment: Fine-grained Permission Management for Mobile Apps", IEEE Infocom 2019—IEEE Conference on Computer Communications. Jun. 17, 2019, pp. 1405-1413.

Anonymous., "Dynamic context-based app permissions", IP.com Prior Art Database. Dec. 6, 2017, pp. 1-7.

Anonymous., "A System and Method of Social Intelligence Risk Assessment for Mobile User Privacy Protection", IP.com Prior Art Database. May 18, 2020, pp. 1-3.

Gianotti et al., "Efficient Mining of Temporally Annotated Sequences", Proceedings of the 2006 SIAM International Conference on Data Mining, 2006, pp. 346-357.

Mell et al., "The NIST Definition of Cloud Computing", National Institute of Standards and Technology, Special Publication 800-145, Sep. 2011, pp. 1-7.

* cited by examiner

COMPUTER ANALYSIS OF SOFTWARE PERMISSIONS FOR PROTECTING ACCESS TO DATA

BACKGROUND

The present invention generally relates to protecting data, and more particularly to methods and systems that allow for applications to have access to a user's data without unknowingly exposing the user to breaches of their private data.

Applications, e.g., programs, request users for permission to acquire data from global positioning systems, phonebooks, and photo galleries, etc. Users grant permission to a specific function for the entire application during a first use. However, when a user grants permission to an application access to their data, an opportunity can be created for malicious collection of a user's private data. This can occur even after a user closes an application, in which the private data of a user may still be unknowingly exposed. For example, in some ride sharing applications, after a user logs into the application, the application can have access to a user's location from global positioning systems (GPS) associated with the user for time periods of up to five minutes after a ride sharing transaction may be completed.

SUMMARY

In accordance with an embodiment of the present invention, a computer implemented method for managing the scope of permissions granted by users to an application is described that includes collecting a set of permissions for an application from an application provider publication; and collecting a process flow for functional steps of the application from a review of the application that is published on a product review type publication. The computer implemented method may also include dividing the functional steps of the application into a plurality of journeys, each of the plurality of journeys having a function associated with a stage of a functional step from a perspective of a user; and matching permissions from the set of permissions for each journey of the plurality of journeys to provide matched permissible permissions to journeys stored in a customer journey store. In some embodiments, the method may further monitor a running application for a user using the matched permissible permissions to the plurality of journeys stored in the customer journey store, wherein an execution of a permission by the running application that is not correlated to the matched permissible permissions in the customer journey store is designated as non-permissible to the user of the application.

A system is also described for managing the scope of permissions granted by users to an application. In some embodiments, the system includes an application description permission extractor for collecting a set of permissions for an application from an application provider publication; and an application review process step extractor for collecting a process flow for functional steps of the application from a review of the application that is published on a product review type publication. The system may further include a journey designator for dividing the functional steps of the application into a plurality of journeys. In some embodiments, each of said plurality of journeys having a function associated with a stage of a functional step from a perspective of a user. A permission to journey matching engine is included for matching permissions from the set of permissions for each journey of said plurality of journeys to provide matched permissible permissions to journeys stored in a customer journey store. In some embodiments, the system further includes an application monitor for monitoring a running application for a user using the matched permissible permissions to the plurality of journeys stored in the customer journey store. An execution of a permission by the running application that is not correlated to the matched permissible permissions in the customer journey store is designated as non-permissible to the user of the application.

In yet another embodiment, a computer program product is described for managing the scope of permissions granted by users to an application. The computer program product includes a computer readable storage medium having computer readable program code embodied therewith. The program instructions executable by a processor to cause the processor to collect, using the processor, a set of permissions for an application from an application provider publication. The computer product may also collect, using the processor, a process flow for functional steps of the application from a review of the application that is published on a product review type publication; and divide, using the processor, the functional steps of the application into a plurality of journeys, each of said plurality of journeys having a function associated with a stage of a functional step from a perspective of a user. In some embodiments, the computer product may match, using the processor, permissions from the set of permissions for each journey of said plurality of journeys to provide matched permissible permissions to journeys stored in a customer journey store. In some embodiments, the computer program product may also monitor, using the processor, a running application for a user using the matched permissible permissions to the plurality of journeys stored in the customer journey store, wherein an execution of a permission by the running application that is not correlated to said matched permissible permissions in the customer journey store is designated as non-permissible to the user of the application.

BRIEF DESCRIPTION OF THE DRAWINGS

The following description will provide details of preferred embodiments with reference to the following figures wherein.

DETAILED DESCRIPTION

Applications, e.g., programs, request users for permission to acquire data and access to systems corresponding to the user, such global positioning systems (GPS), phonebooks, and photo galleries, etc., which the application may use in providing the function for which they were designed. Users grant permission to a specific function for the entire application during a first use. However, when a user grants permission to an application access to their data, an opportunity can be created for malicious collection of a user's private data. It has been determined that even though operating system (OS) levels of control do not allow applications to collect user data without a user permission, an application can still send collected data after it has been closed. This is even the case when the application functionality does not require this private data to be functional. The methods, systems and computer program products of the present disclosure provide an intelligent permission management system that prevents excessive permissions being granted to applications at startup; detects minimum permissions needed for specific consumer sessions with the application; and turns off permission granted at the end of a consumer session with an application. It is noted that the following description provides examples in which the application is related to transportation fields. However, the present disclosure is not limited to only this application, as the methods, systems and computer program products described herein are equally applicable to any application that accesses data for a user of the application. The method, systems and computer program products of the present disclosure are now described in greater detail with reference to FIGS. 1-8.

Figure 1:
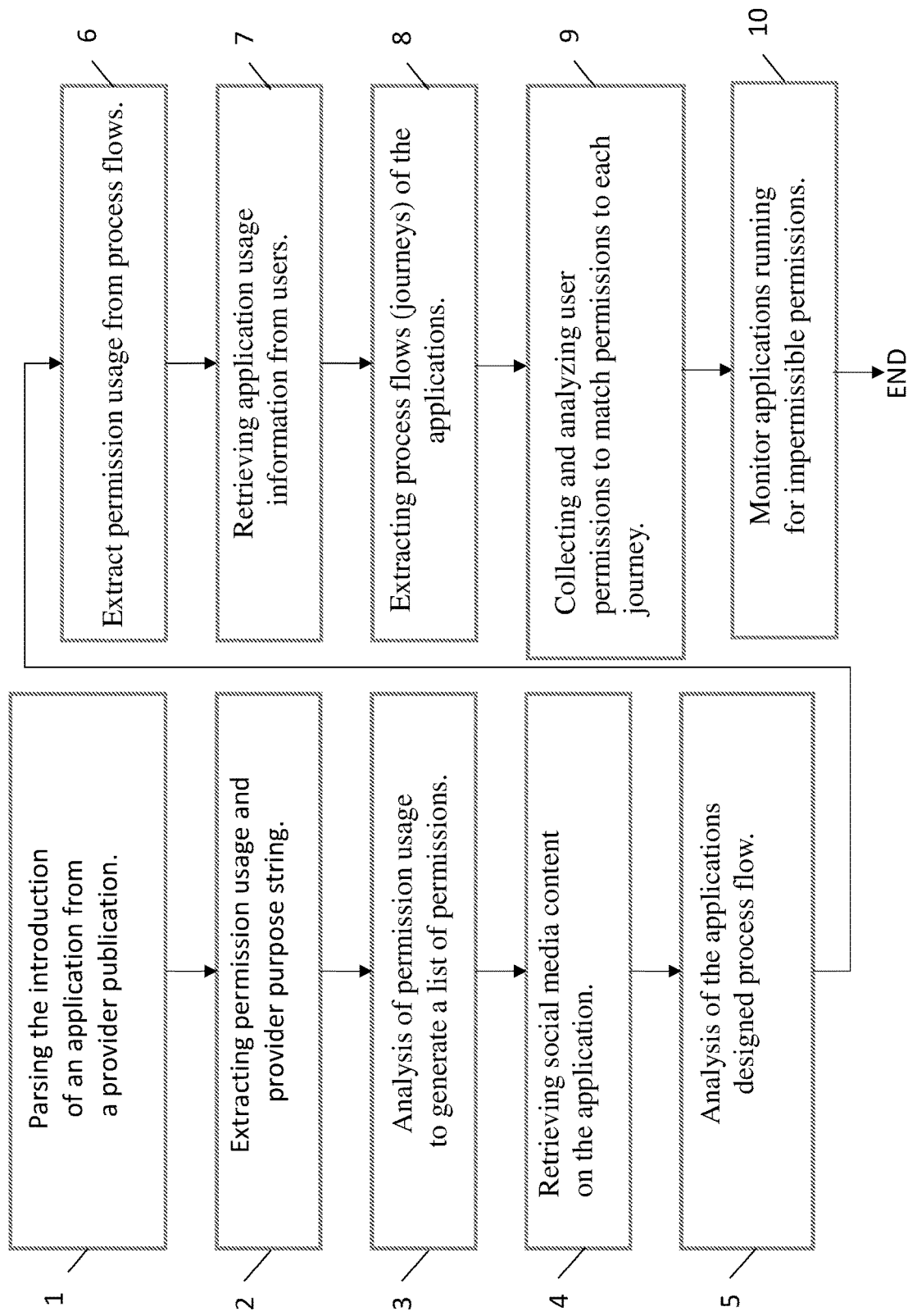
FIG. 1 is a block/flow diagram illustrating a method of managing access of an application to the data of a user that is using the application, in accordance with one embodiment of the present disclosure.
Figure 2:
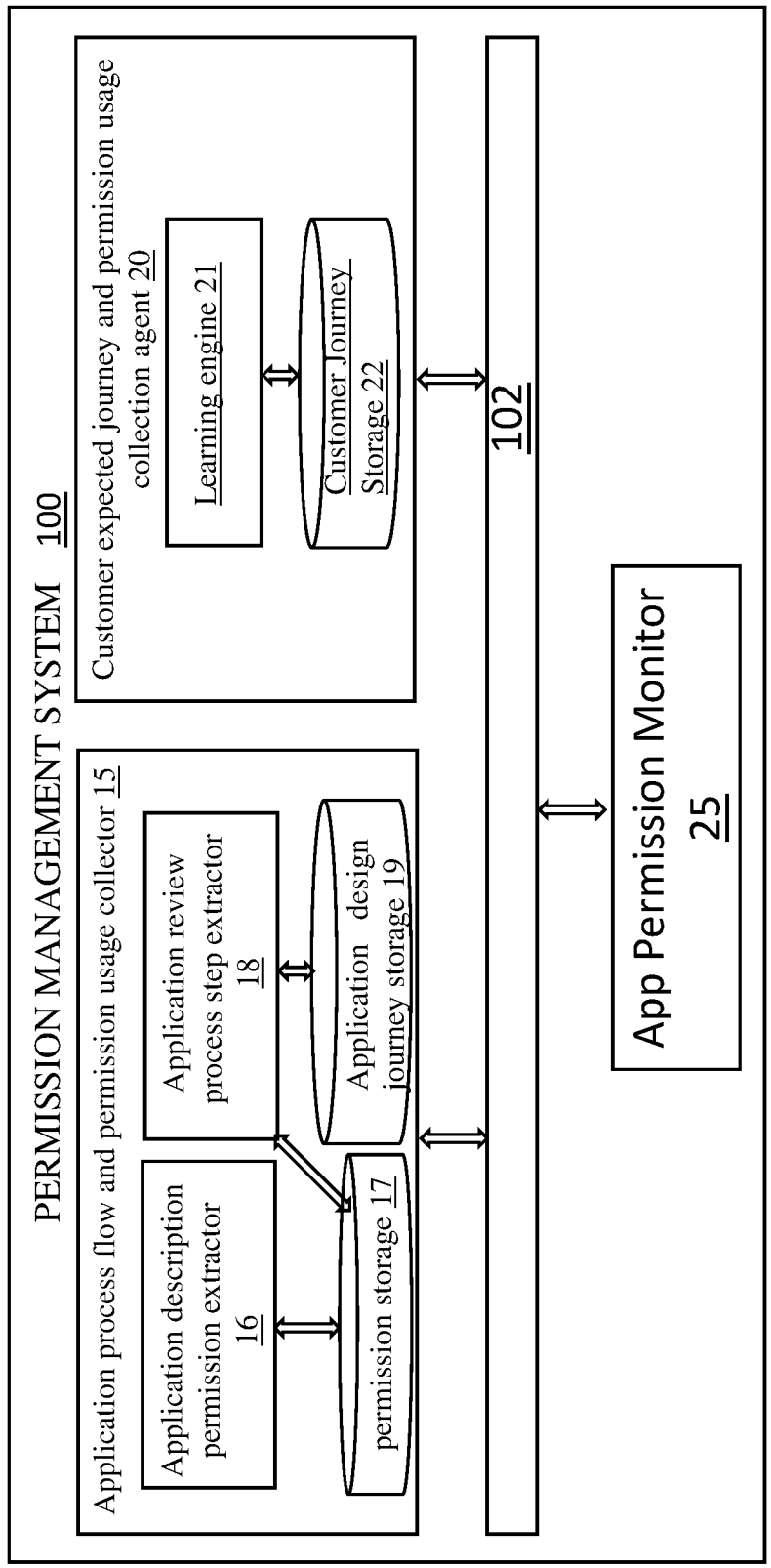
FIG. 2 is a block/flow diagram illustrating a system for managing access to a user's data when the user grants permission to an application to access that data, in accordance with one embodiment of the present disclosure.
Figure 3:
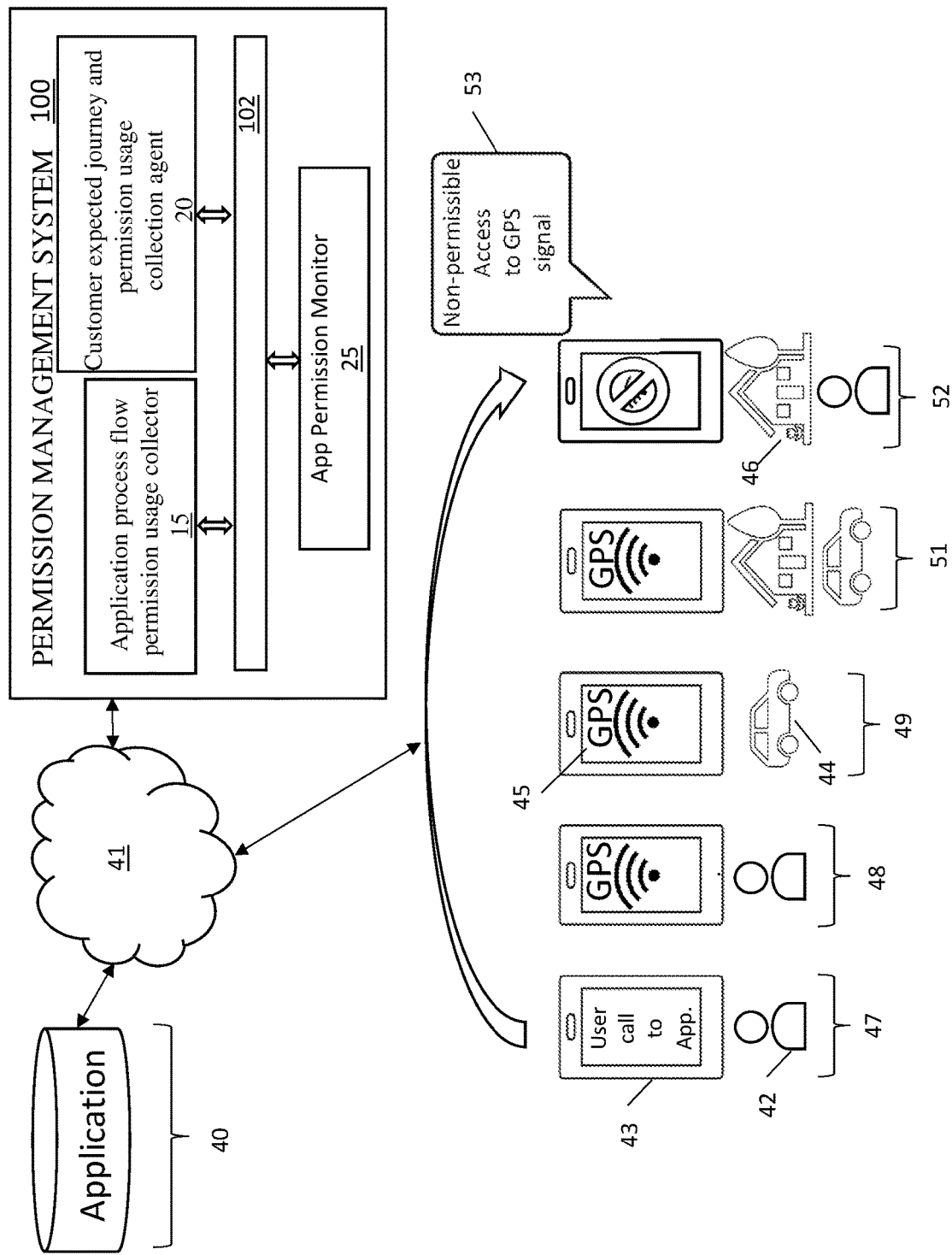
FIG. 3 is an illustration of the application for the methods and systems describe herein to transportation applications, in which the methods and systems manage the access of applications to a users' data when the user provides permission for such access, in accordance with one embodiment of the present disclosure.

FIG. 1 illustrates a method of managing access of an application to the data of a user that is using the application. FIG. 2 illustrates a system for managing access to a user's data when the user grants permission to an application to access that data. FIG. 3 is an illustration of the application for the methods and systems describe herein to transportation applications.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The methods, systems and computer program products an provide an intelligent application permission management system to detect and prevent abnormal collection of a user private data that is collected, e.g., unknowingly collected, by the application after a user has given permission to the application to use their data in carrying out the intended function of the application. The methods, systems and computer program products described herein allow the application access to the intended data to which the user has granted the application access. The authorized access is directed to functional data corresponding to the user. The term "functional data" is user data that is employed by the application to executing the function that the user intends for the application to perform when the user is utilizing the application. The data that is referred to as being "abnormally collected" is non-functional data. "Non-functional data" is data corresponding to the user that is not employed by the application to executing the function that the user intends for the application to perform when the user it utilizing the application.

In some embodiments, in which the methods, systems and computer program products are applied to transportation applications, reasonable customer journeys are defined, and the needed permissions to obtain customer data are defined. A "transportation application" may be a set of functions, e.g., embodied in software (which can be stored on a form of memory (e.g., hardware memory), that is executable by a device including at least one hardware processor, in which the functions can match a user with a transport vehicle having a destination matching the desired destination of the user. As will be described herein, these definitions for the "reasonable customer journey" and the needed "permissions to obtain customer data" may be determined by analyzing data corresponding to both the user and the transportation application. The "reasonable customer journey" is the directions by which a transportation vehicle takes a user from the pickup point to a destination. The "permissions to obtain customer data" is the permission by the user that allows the transportation application to search the user data for the data that is needed by the transportation application to take the user from the pickup point to the destination. That could include GPS information indicating the location of the user for pickup at the start of the customer journey.

The data being analyzed can include information for the transportation application information, user behavior data, application introduction posts, and social media data (e.g., user social media data). In some embodiments, the methods, systems and computer program products further include detecting the end of a consumer journey, and then helps the user to turn off the related permissions.

The methods described herein may include two stages. A first stage can include building a database of the types of permissions to user's data that applications need to provide the designed functions of the applications. The second stage is the application of that database to a determine the appropriate uses and inappropriate uses of access to user data resulting from the permissions the user has provided to an application, when a particular user is using the application for its designed function.

Referring to the computer implemented method depicted in FIG. 1, the method can begin at the first stage from the application provider perspective. This can include collecting a set of permissions for an application from an application provider publication, which in some embodiments can be provided by blocks 1, 2, and 3.

The computer implemented method may begin with determining from the application the types of permissions that are going to be required to run the transport application. This can begin with accessing a web page from which the application is available to a user. This may be referred to as an application store, or app store. An application store (app store) can be a digital distribution platform for mobile apps on operating systems, such as android, iOS, iPadOS, Windows etc. The store can allow users to browse and download apps.

At block 1 the beginning phase of the method may include parsing the introduction of the application. The introduction of the application that is published on a page of an application store typically includes a description of the types of permissions the application will need in order for the user to use the application. This can include accessing a web page of an application store using a web crawler, and then using natural language processing to analysis the web pages to extract permission data therefrom.

A crawler is a computer program that automatically searches documents on the Web. Crawlers are primarily programmed for repetitive actions so that browsing is automated. Search engines use crawlers most frequently to browse the internet and build an index. In some embodiments, a crawler looks for information on the Web, which it assigns to certain categories, and then indexes and catalogues it so that the crawled information is retrievable and can be evaluated.

Natural language processing (NLP) is a subfield of computer science, information engineering, and artificial intelligence concerned with the interactions between computers and human (natural) languages, in particular how to program computers to process and analyze large amounts of natural language data. Natural language processing frequently involves, natural language understanding, and natural language generation.

The use of natural language processing to extract permission requests may be referred to as parsing.

In some embodiments, parsing the introduction of the application may include analysis of each page of the application, and categorizing those pages for permissions. For example, the application may have a "permissions" page. The permission page may indicate what when using the transportation application on a device, e.g., mobile device and/or smart phone, may need to access certain functions and stored data on the device, e.g., mobile device and/or smart phone. For example, the permissions pages may indicate that the application may need to use the GPS signal of the phone (access to the GPS receiver of the user's phone), which the application may use to determine the location of the user for the start of the customer journey, i.e., the start point for the directions to the final destination selected by the user. GPS data from the users phone is only one example of user data that the application may want to have permission to access. In other embodiments, the permissions may include requesting access to the contacts stored in the user's device. In yet other examples, the permissions page of the application may further indicate that the transportation application may access a user's camera, video camera, microphone, and stored data, such as photos.

At block 2, the computer implemented method may continue with extracting permission usage and purpose string from the provider. This step extracts the data from the parsed pages of the application including the permissions that are needed for the application, and the functions that the data obtained through the permission provides as part of the application.

At block 3, the computer implemented method analyzes the application flow and related permissions. The related permissions were determined from blocks 1 and 2 of the process flow depicted in FIG. 1 as described above. The permissions are categorized according the flow sequence of the transportation application. For example, a travel application may have the following stages: 1) user seeking a taxi; 2) user taking a taxi; 3) feedback by user rating taxi service; and 4) update profile. The permissions may be categorized to the stages as follows: 1) user seeking a taxi may need permission to employ a user's mobile device GPS and camera; 2) taking a taxi may need permission to employ the mobile device GPS; 3) feedback by the user rating taxi service may need permission to employ a microphone for voice input; and 4) the update profile step may need permission to access the gallery of photos in the memory of the device of the user that is running the application.

From blocks 1, 2 and 3, a list of permissions for an application can be generated.

The process steps described with respect to blocks 1, 2 and 3 may be performed by a permission management system 100 that includes an application process flow and permission usage collector 15, as depicted in FIG. 2. More specifically, blocks 1, 2 and 3 may be performed by an application description permission extractor 16 for collecting a set of permissions for an application from an application provider publication, which can perform blocks 1, 2 and 3 for each application used by the user and store the matches for the permission requests to data to the steps of an application in an application permission storage 17. The application process flow and permission usage collector 15 may employ at least one form of memory such as hardware memory for executing a plurality of steps to execute instructions for blocks 1, 2 and 3 using a hardware processor. For example, the process flow may employ a web crawler and natural language processing to perform the above described functions in blocks 1, 2 and 3. The system 100 may be integrated with a mobile device of the user, however, in other instances, the system may interact with the user via a cloud interface, as described herein.

Further, the permission requests to data for a user for application that are determined by the process flow described with respect to blocks 1, 2 and 3, e.g., from the descriptions of permission requests in the introductions for applications available through application stores, are stored in memory. For example, the list of permission requests to data for a user for applications that are extracted from text of an application store may be stored in an application permission store 17.

Referring back to FIG. 1, the method for managing permissions of a user specific to the needs of the functions of an application, such as a transportation application, can continue from the application provider perspective with a social based description analysis collecting a process flow for functional steps of the application from a review of the application that is published on a product review type publication. This sequence may include blocks 4, 5 and 6, as depicted in FIG. 1.

The introduction that is provided in an application store may not describe the process flow, e.g., the journey that a user experiences while the application executes to provide the function for which the user is employing the application. The process flow may be described in more detail by analysis of publications describing the application that was analyzed in blocks 1, 2 and 3. The publications may be social media based, may be blog based, or can be application descriptions described on web pages.

Block 4 includes retrieving social media content and/or web based published content on the transportation application. For example, the social media content may be from websites and applications that enable users to create and share content or to participate in social networking. Social media is any digital tool that allows users to quickly create and share content with the public. Social media are interactive computer-mediated technologies that facilitate the creation or sharing of information, ideas, career interests, and other forms of expression via virtual communities and networks. Some common features for social media can including one or more of 1) social media being interactive Web 2.0 Internet-based applications; 2) user-generated content such as text posts or comments, digital photos or videos, and data generated through all online interactions, is the lifeblood of social media; 3) user's create service-specific profiles for the website or app that are designed and maintained by the social media organization; and 4) social media facilitate the development of online social networks by connecting a user's profile with those of other individuals or groups.

In some embodiments, the social media content may be a blog. A blog can be a discussion or informational website published on the World Wide Web consisting of discrete, often informal diary-style text entries.

It is noted that the above descriptions of social media are provided for illustrative purposes only, and are not intended to limit the present disclosure. Any publication, such as web based publications, that describe the application can serve the basis for the content for analysis in blocks 4, 5 and 6.

Block 5 includes analysis of the applications designed process flow collected from social media or website introduction. Block 5 includes extracting all process flows of the application by text analysis. In some embodiments, the methods employ text analysis and tagging technology to define the process flow that is collected from published social media and websites in a manner that is close to the way the process flow is in the providers design, i.e., the process flow of the actual application. For example, social media and websites describing the same application (i.e., the same application that was analyzed in blocks 1, 2 and 3) may include the description of the transportation application asking for a user that has opened to the application to enter a designation, e.g., by including a data entry box titled "where to?". The descriptions for the application on social media and websites may further illustrate that via using the application you will meet a driver who provides the transportation services. The descriptions for the application on social media and websites may further indicate that during use of the application, the user may "check your ride", which may include that the user confirm the vehicle/driver picking them up for their drive has a license plate matching an assigned license plate for the vehicle provided by the application. The description of the application on social media and websites may also include steps for rating the driver providing the transportation services to the user, and a payment step for the application.

From the above descriptions of the application from social media and web pages at block 5, using text analysis and tagging technology, a process flow (also referred to as Journey) can be described that includes: 1) entering a destination (where to?), 2) tracking on a map, 3) display license plate, car model, driver, 4) payment, and 5) rate. The type of user permission to access the user's data in order for the application to perform its function is then determined. In the above example, the permissions may include permission by the user for the application to access the GPS signal of the user's device, which can be running the application, and for the application to access the payment data corresponding to the user. The payment data may be referred to as a wallet.

Referring to FIG. 1, in a following step at block 6, the computer implemented method may extract permission usage from the process flows, i.e., journeys, of the application by text analysis. Block 6 may employ the permissions in the application permission storage 17 to match the types of permissions from the application permission storage 17 with the stages of the process flow collected from social media or websites at block 5. This step may employ natural language processing to match the permissions with the stages of the process flow.

Blocks 4, 5 and 6 can provide a process flow from social media and web pages. The information obtained from social media and web pages can be correlated to the process flow from the provider of the application. Blocks 4, 5 and 6 may be performed for each application that is being used by the user. The process flow that is provided by blocks 4, 5 and 6 may correlate the permissions, such as those saved in the permission store 17, with the different stages of the process flow that is determined using blocks 4, 5, and 6.

The process steps described with respect to blocks 4, 5 and 6 may be performed by a permission management system 100 that includes an application process flow and permission usage collector 15, as depicted in FIG. 2. More specifically, blocks 4, 5 and 6 may be performed by an application review process step extractor 18, which can perform blocks 4, 5 and 6 for each application used by the user and store the matches for the permission requests to data to the steps of an application according to descriptions of the application on social media and web pages in an application design journey storage 19. The application process flow and permission usage collector 15 may employ at least one form of memory such as hardware memory for executing a plurality of steps to execute instructions for blocks 4, 5 and 6 using a hardware processor. The system 100 may be integrated with a mobile device of the user, however, in other instances, the system may interact with the user via a cloud interface, as described herein. Similar to blocks 1, 2 and 3, the functions of blocks 4, 5 and 6 can be achieved using a web crawler, and natural language processing technology.

Further, the matches of the permission requests to data for a user to the steps of an application that are determined by the process flow described with respect to blocks 4, 5 and 6 are stored in memory. For example, the matches of the permission requests to data for a user to the steps of an application may be stored in an application design journey store 19.

Referring back to FIG. 1, the method for managing permissions of a user specific to the needs of the functions of an application, such as a transportation application, can continue to a user behavior perspective analysis that includes blocks 7, 8 and 9. In some embodiments, at this point of the process flow, permissions gleaned from publications of an application store have been matched to a process flow (which can include multiple journeys). The method continues with dividing the functional steps of the application into a plurality of journeys, each of said plurality of journeys having a function associated with a stage of a functional step from a perspective of a user; and matching permissions from the set of permissions for each journey of said plurality of journeys to provide matched permissible permissions to journeys stored in a customer journey store. In some embodiments, this process sequence includes blocks 7, 8 and 9.

Blocks 7, 8 and 9 of the method analyze a pool of user's interactions with the applications, further defining the correlation between the permissions and the different steps for the process flow of the application.

The user behavior analysis may be conducted by a customer expected journey and permission usage collection agent 20. The collection agent 20 may include at least one hardware processor for actuating a set of instructions according to blocks 7, 8 and 9, which may be saved in a form of memory, such as hardware memory.

Block 7 can include getting application usage information from the user. This can include getting a list of what applications the user is using. For example, the user may be using transportation applications that are specific to certain application providers. When a user logs into the system that provides the method for managing permissions of a user, the user can provide access to the applications that the user has stored on their devices. This can be a component of a registration step. Registration may include receiving permission from a user for data collection. To the extent implementations of the invention collect, store, or employ personal information provided by, or obtained from, individuals (for example, current locations of drivers, historical records of drivers, etc.), such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

Referring to block 8, the method may continue with extracting all possible process flows (also referred to as user journeys) of the applications from the available users. In this example, a single interaction with the application may have multiple journey's. A journey may be a stage of the application. From recorded execution of applications by the user's, a customer journey engine divides a total interaction by the user into individual journey. Each journey of the total interaction time typically corresponds to a step of the method. As will be further described below, the division of a user's total interaction with an application into journeys may be defined using equations 1-3.

In one embodiment, from a behavior perspective, defining the user journey (also referred to as customer journey) may include showing every customer journey as "temporally annotated sequences". Temporally annotated sequences are an extension of sequential patterns that enrich sequences with information about the typical transition times between their elements, as illustrated in equation 1:

$$T = S_0 \xrightarrow{a_1} S_1 \xrightarrow{a_2} S_2 \xrightarrow{a_3} \ldots \xrightarrow{a_n} S_n$$

Given a set of items T, a temporally-annotated sequence of length n>0, called TAS, is a couple T, S is a sequence and a is a temporal annotation.

As an example, a TAS over the web pages visiting along several sessions can be the following:

$$\{'/'\} \xrightarrow{2} \{'/papers.htlm'\} \xrightarrow{90} \{'/kdd.htlm'\} \quad \text{Equation 2}$$

Equation 2 represents a sequence that starts from the root, then after 2 seconds continues with page 'papers.html' and finally, after 90 seconds ends with page 'kdd.html'.

In accordance with some embodiments of the present disclosure, every customer journey is split into many sub-journey by temporal annotations larger than x, in accordance with equation 3:

$$\{'/'\} \xrightarrow{2} \{'/papers.htlm'\} \xrightarrow{90} \{'/kdd.htlm'\} \xrightarrow{3600} \quad \text{Equation 3}$$
$$\{'/'\} \xrightarrow{2} \{'/papers.htlm'\} \xrightarrow{90} \{'/kdd.htlm'\}$$

Using the above equations, i.e. equations 1-3, the method can apply "Sequential Pattern Mining" to find customer journey patterns.

Figure 4:
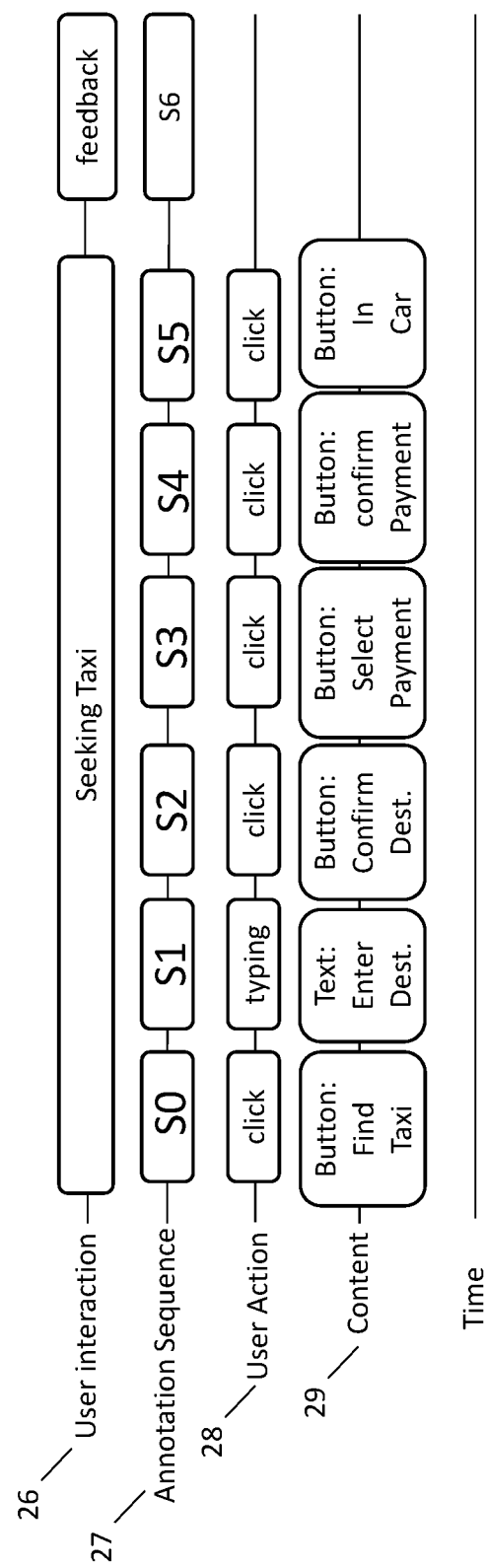
FIG. 4 is an illustration of defining the customer journeys within an interaction of the customer with an application.

FIG. 4 depicts defining the customer journeys within an interaction of the customer with an application. The illustration illustrates a user's interaction 26 with an application as a function of time. The interaction extends along the entirety of the timeline. However, the timeline of the interaction may be broken down into journeys, and each journey may have a sequence of steps. For example, a user interaction with a transportation application may include separate journeys in a sequence of "seeking a taxi", "taking a taxi", "feedback" (feedback on quality of taxi service), and "update user profile". FIG. 4 illustrates one journey, e.g., "seeking taxi" portion, of a interaction, in which the journey is broken into a sequence of steps.

The interaction by the user to the application is for a function. In the example that is illustrated in FIG. 4, the interaction 26 by the user with the application is for seeking a taxi. Via equations 1-3, an annotated sequence 27 can be provided within the interaction, wherein each segment S0, S1, S2, S3, S4, S5 and S6, of the sequence is correlated to a time period within the interaction 26, and each segment may require a user action 28 for content 29 needed by the application to function. For example, the user may have to click (select) a selection field (user action 28) of a user interface with the application to find a taxi (content 29) at segment S0. The user may have to type (enter data) into data entry field (user action 28) of a user interface with the application to find a taxi (content 29) at segment S1.

In an third segment S2, the user may have to click (select) a selection field (user action 28) of a user interface with the application to confirm a destination (content 29) that was previously entered at segment S1. The fourth segment S3 in the example depicted in FIG. 4 may start a payment stage. In a fourth segment S3, the user may have to click (select) a selection field (user action 28) of a user interface with the application to confirm a select payment (content 29). In an fifth segment S4, the user may have to click (select) a selection field (user action 28) of a user interface with the application to confirm the payment (content 29) that was previously entered at segment S3. In the sixth segment S5, the user may have to click (select) a selection field (user action 28) of a user interface with the application to confirm the that the user is in the taxi, which would end the "find a taxi" segment of the interaction for the application.

The equations 1-3, may provide the annotated sequence as provided in the above example.

Referring to FIG. 1, in a following step, the user behavior perspective stage of the method can continue with collecting and analyzing user permissions in each journey at block 9. At this stage of the process flow, the collection of permissions that have been collected at blocks 1-3 from the application provider descriptions of the application, such as the permissions page of an application introduction of an application store, and the descriptions of the different stages of the application from social media that have been collected at blocks 4-6 may be used in combination with the above understandings of the journeys from a user perspective to determine at what times permissions granted by the user is applicable to the functioning of the application. Block 9 may also determine when the user is actually granting permission to the application and when not.

The user behavior analysis may be conducted by a customer expected journey and permission usage collection agent 20. The collection agent 20 depicted in FIG. 2 may include at least one hardware processor for actuating a set of instructions according to blocks 7, 8 and 9, which may be saved in a form of memory, such as hardware memory. The user behavior analysis may include memory for specifically applying equations 1, 2 and 3 to the data of how users interact with the application from the user perspective. The customer expected journey and permission usage collection agent 20 may also employ a learning engine 211 that employs artificial intelligence in matching the permissions with the different stages of the journeys. Artificial intelligence (AI) is the simulation of human intelligence processes by machines, especially computer systems. These processes include learning (the acquisition of information and rules for using the information), reasoning (using rules to reach approximate or definite conclusions) and self-correction.

The learning engine 21 may include neural networks, expert systems, genetic algorithms, intelligent agents, logic programming, and fuzzy logic. Neural network artificial intelligence is based loosely upon the cellular structure of the human brain. Cells, or storage locations, and connections between the locations are established in the computer. As in the human brain, connections among the cells are strengthened or weakened based upon their ability to yield "productive" results. The system uses an algorithm to "learn" from experience. Neural nets are an inductive reasoning method. Expert systems are usually built using large sets of "rules." Genetic algorithms utilize fitness functions, which are relationships among criteria, to grade matches.

In one example, the learning engine 21 is an artificial neural network providing device. An artificial neural network (ANN) is an information processing system that is inspired by biological nervous systems, such as the brain. The key element of ANNs is the structure of the information processing system, which includes a large number of highly interconnected processing elements (called "neurons") working in parallel to solve specific problems. ANNs are furthermore trained in-use, with learning that involves adjustments to weights that exist between the neurons. An ANN is configured for a specific application, such as pattern recognition or data classification, through such a learning process.

Still referring to FIG. 2, the matches of the permissions to the different stages of the journeys of an application may be saved in a customer journey storage 22. This storage may be used in a stage when a user is using an application, in which the customer journey storage 22 provides for comparison between the journeys of the user and the types of permissions that are allowable at the different stages of the journeys. More specifically, the customer journey storage 22 including matches of permissions that are needed for applications to function linked to journeys in the process flow of applications is used by an application (app.) permission monitor 25 of the permission management system to detect when the permissions granted by the user is employed by the application to access data for the user that is "abnormally collected" and is "non-functional data". "Non-functional data" is data corresponding to the user that is not employed by the application to executing the function that the user intends for the application to perform when the user it utilizing the application.

Figure 5:
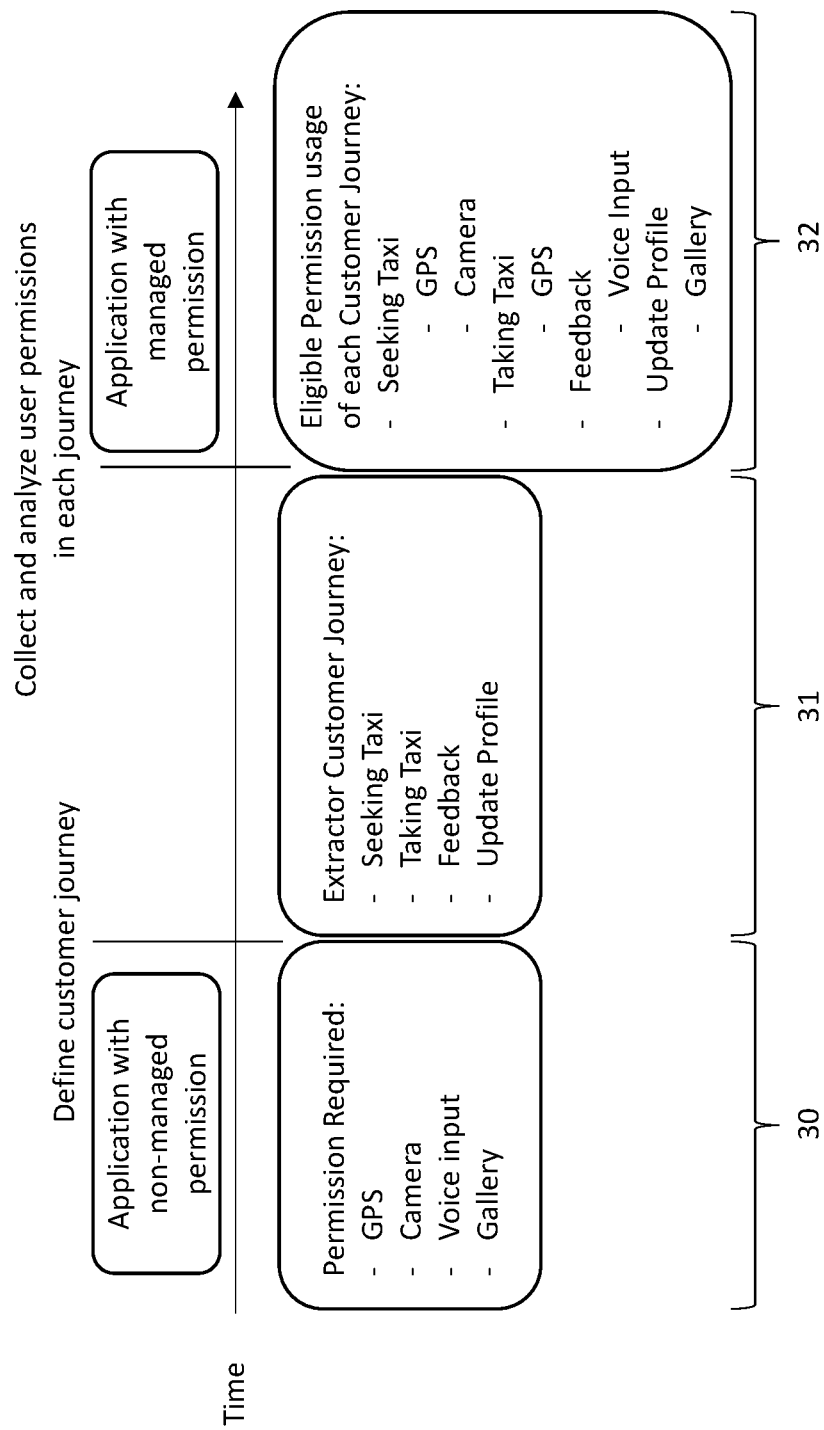
FIG. 5 is an illustration illustrating the different stages of journeys being extracted from an interaction with the application from a customer perspective, in which the permission have been matched up with the different stages of the journeys.

FIG. 5 is an illustration illustrating the different stages of journeys being extracted from an interaction with the application from a customer perspective, in which the permission have been matched up with the different stages of the journeys. FIG. 5 first illustrates that an application would typically require in permissions 30. This is referred to as an application with unmanaged permissions. The unmanaged permissions can be determined by blocks 1 to 3. As described above, the method may continue with defining the customer journey at the stage having reference number 31. This includes both a perspective from social media to determine the process flow of an application, as described in blocks 4 to 6, as well as an analysis from the customer perspective to determine the different subsets of the different journeys in the process flow of the application, as described in blocks 7 to 9.

Still referring to FIG. 5, the method may continue with matching the permissions to different journeys. This on the timeline as an application with managed permissions 32. For example, for a transportation application having a journey titled "seeking taxi", the eligible permissions may include use of a GPS signal corresponding to the user, and the permission may further include use of a camera. Turning to journey titled "taking taxi", the eligible permissions may include use of GP signal corresponding to the user. Turning to the journey titled "feedback", the eligible permissions can include voice input. Referring to the journey titled "update profile", the eligible permissions can include access to the gallery of images for the user.

Some examples of inappropriate permission usage can include use of a GPS signal during the feedback journey. The feedback stage does not need a GPS signal in order for the application to function. Another example of an impermissible permission, is when an application uses the GPS signal during the user profile journey of the transportation application.

The user behavior analysis may be conducted by a customer expected journey and permission usage collection agent 20 of the permission management system 100. The collection agent 20 may include at least one hardware processor for actuating a set of instructions according to blocks 7, 8 and 9, which may be saved in a form of memory, such as hardware memory. The matches of the permissions to the functions of the journeys may be saved in customer journey storage 22, as depicted in FIG. 2.

The matches of the permissions given by the user to the application to collect functional data from the pool of users running historical applications that are saved in the customer journey storage 22 may then be used to monitor applications being run by users to ensure that the application is not abnormally collecting data. Referring to FIG. 1, in some embodiments, the method continues with monitor a running application for a user using the matched permissible permissions to the plurality of journeys stored in the customer journey store, wherein an execution of a permission by the running application that is not correlated to said matched permissible permissions in the customer journey store is designated as non-permissible to the user of the application, which can include block 10 of FIG. 1. The method steps at block 10 may be executed by the application (app.) permission monitor 25 depicted in FIG. 2. The application (app.) permission monitor 25 may employ at least one form of memory such as hardware memory for executing a plurality of steps to execute instructions for employing the matches stored in the customer journey storage 22 to determine the suitability of data collection by applications from users using a hardware processor. The application permission monitor 25 may employ natural language processing and artificial intelligence to employ the matches stored in the customer journey storage 22 to determine the suitability of data collection by applications from users. The descriptions noted above for the learning engine 21 regarding natural language processing and artificial intelligence are applicable to the use of these elements in the application permission monitor. The system 100 including the application permission monitor 25 may be integrated with a mobile device of the user, however, in other instances, the system may interact with the user via a cloud interface, as described herein.

FIG. 3 is an illustration of the application for the methods and systems describe herein to transportation applications, in which the methods and systems manage the access of applications to a users' data using the application permission monitor 25. The application permission monitor 25 is a component of the permission management system 100, which can be in communication with both application providers, e.g., applications 40, and users 42 through a network 41 that can be provided through the internet. Referring to FIG. 3, the users 42 may be running an application on their mobile device 43. The user 42 can start a transportation application, e.g., "user call to app.", at stage 47 through the interface of a mobile device 43. The user 42 may be registered with the permission management system 100. The application may be a transportation application, such as ride sharing or a taxi type transportation service. The application 40 in response to the call for the service, may access the GPS signal 45 of the mobile device 43 corresponding to the user 42. This may be to provide the start location for transportation session at stage 48. This access to the user's data is considered permissible and is functional for the application 40. The user 42 has granted permission for this type of data access. In this instance, the application permission monitor 25 does not designate the permission to access the GPS as being an abnormal collection of data, e.g., non-functional data. At stage 49, the user 42 is a passenger in a taxi service 44, and the GPS signal continues for tracking the transportation session as part of the function of the application 40. The user 42 has granted permission for this type of data access. In this instance, the application permission monitor 25 does not designate the permission to access the GPS as being an abnormal collection of data, e.g., non-functional data. At stage 51, the user 42 being a passenger in the taxi service 44 has reached the destination 46 of the transportation session, and at stage 52 the user exits the taxi service 44.

As illustrated in FIG. 3, in the event the GPS signal is still being tracked by the application 40 after stage 51, e.g., after the user 40 has reached the transportation destination, the application permission monitor 25 designates that access to the user's data as being an abnormal collection of data. Being that the transportation session ends with reaching the destination, the application does not need the GPS signal to function, and therefore, that type of data collection is non-functional and an abnormal collection of data. The application permission monitor 25 can alert the user 40 to turn off the data access, e.g., turn off the GPS signal, through the mobile device interface, e.g., by displaying a message 53 on the display of the user's mobile device 43. In some embodiments the application permission monitor 25 may also turn off the access to the user's data automatically when an abnormal collection of data, e.g., collection of non-functional data, is detected, such as in stage 52.

Figure 6:
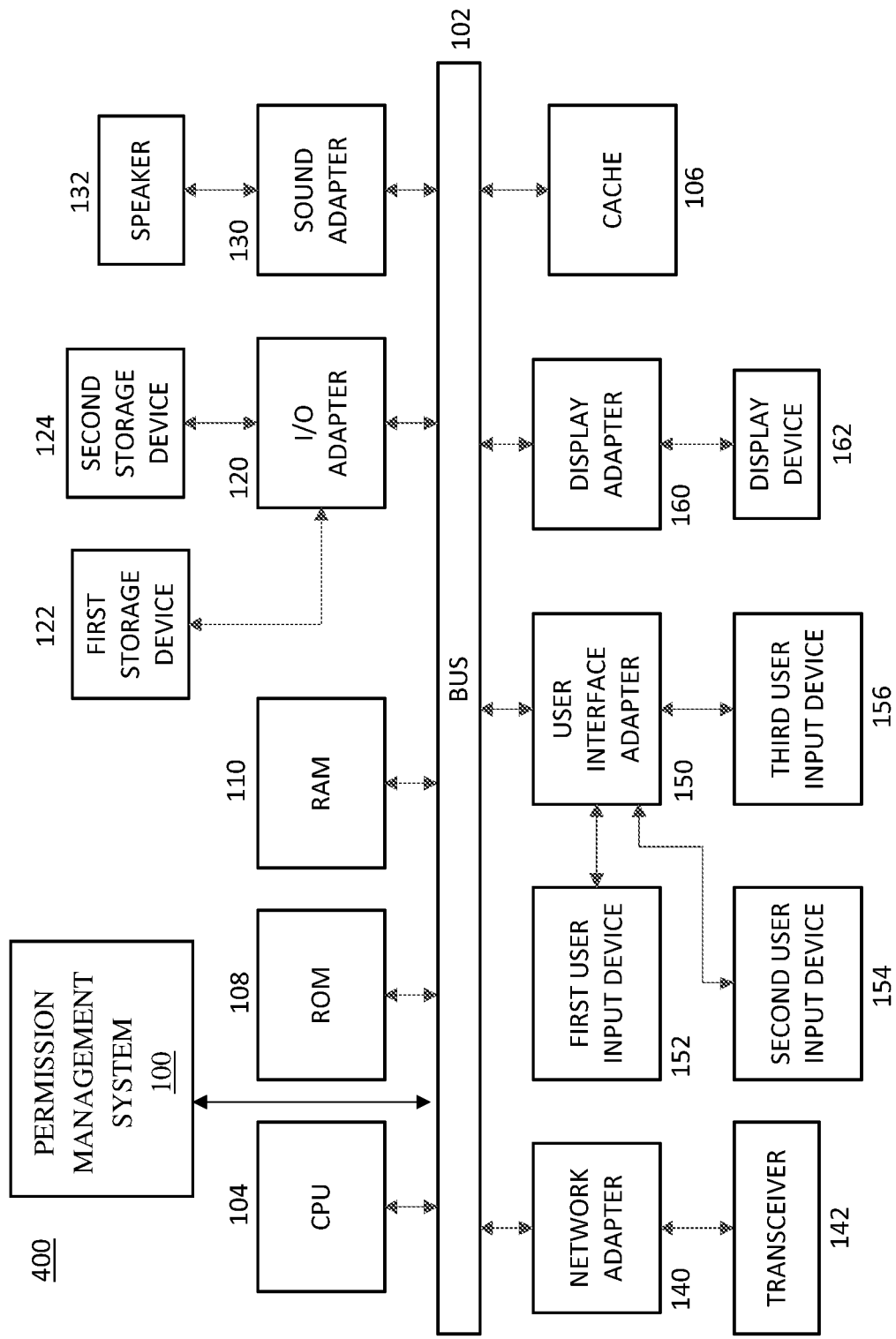
FIG. 6 is a block diagram illustrating a system that can incorporate the system for managing access of an application to the data of a user that is depicted in FIG. 2, in accordance with one embodiment of the present disclosure.
Figure 7:
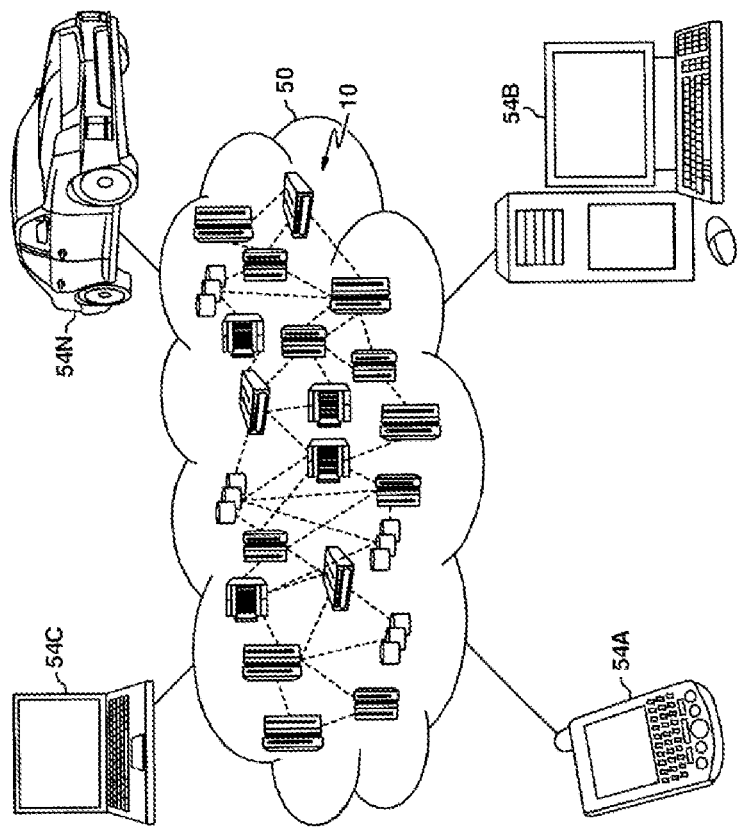
FIG. 7 depicts a cloud computing environment according to an embodiment of the present disclosure.
Figure 8:
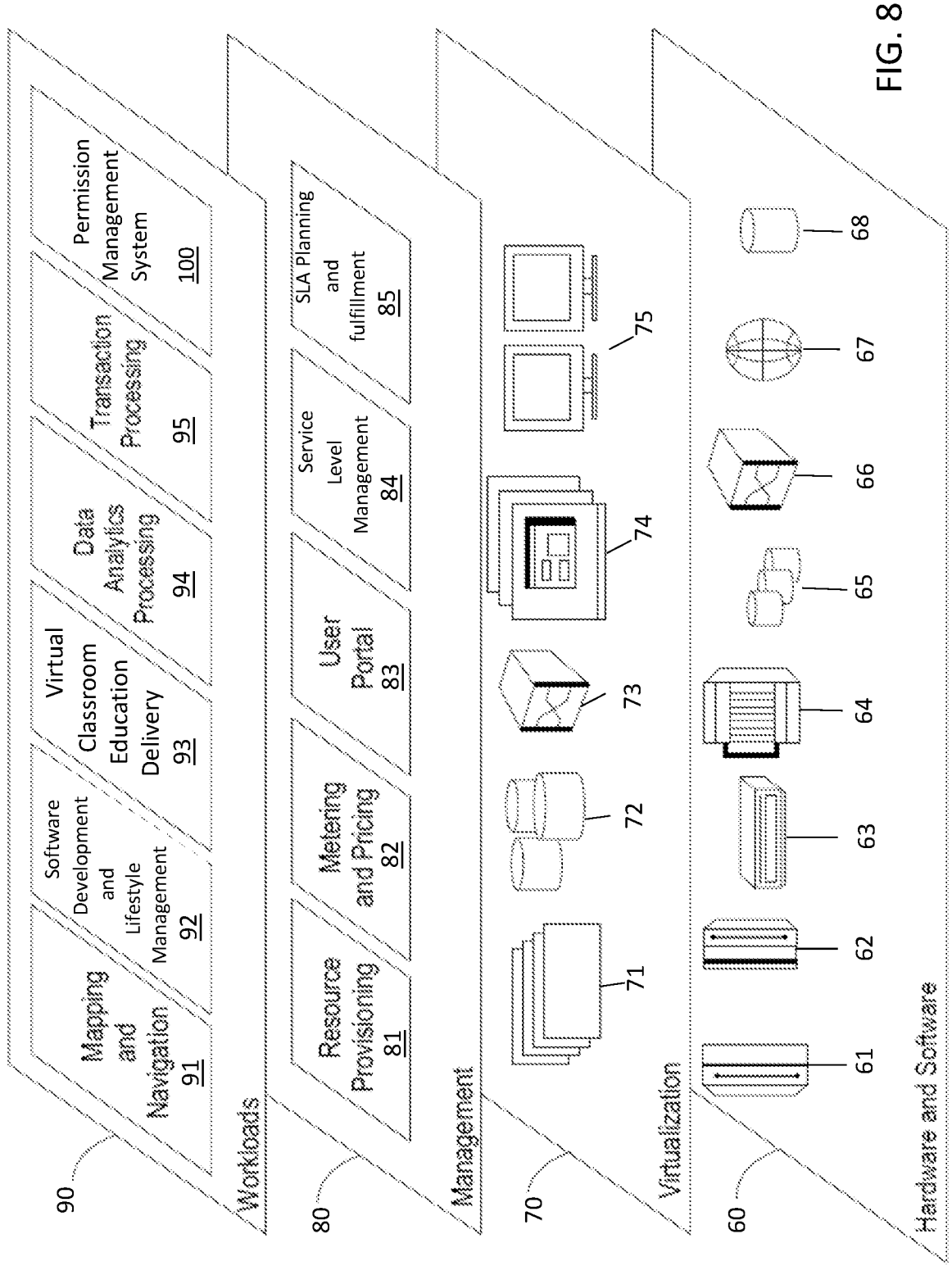
FIG. 8 depicts abstraction model layers according to an embodiment of the present disclosure.

The permission management system 100 may be integrated into the processing system 400 depicted in FIG. 6. The processing system 400 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102. The bus 102 interconnects a plurality of components has will be described herein.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

These and other variations of a hardware processor subsystem are also contemplated in accordance with embodiments of the present invention.

The system 400 depicted in FIG. 5, may further include a first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 152, 154, and 156 can be the same type of user input device or different types of user input devices. The user input devices 152, 154, and 156 are used to input and output information to and from system 400.

Of course, the processing system 400 may also include other elements (not shown), as readily contemplated by one of skill in the art, as well as omit certain elements. For example, various other input devices and/or output devices can be included in processing system 400, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 400 are readily contemplated by one of ordinary skill in the art given the teachings of the present invention provided herein.

The present invention may be a system, a method, and/or a computer program product at any possible technical detail level of integration. The computer program product may include a computer readable storage medium (or media) having computer readable program instructions thereon for causing a processor to carry out aspects of the present invention.

For example, the present disclosure provides a computer program product comprising a non-transitory computer readable storage medium having computer readable program code embodied therein for providing a permission management system. In some embodiments, the computer program product for providing the permission management system includes a computer readable storage medium having computer readable program code embodied therewith, the program instructions executable by a processor to cause the processor to collect, using the processor, a set of permissions for an application from an application provider publication. The computer product may also collect, using the processor, a process flow for functional steps of the application from a review of the application that is published on a product review type publication; and divide, using the processor, the functional steps of the application into a plurality of journeys, each of said plurality of journeys having a function associated with a stage of a functional step from a perspective of a user. In some embodiments, the computer product may match, using the processor, permissions from the set of permissions for each journey of said plurality of journeys to provide matched permissible permissions to journeys stored in a customer journey store. In some embodiments, the computer program product may also monitor, using the processor, a running application for a user using the matched permissible permissions to the plurality of journeys stored in the customer journey store, wherein an execution of a permission by the running application that is not correlated to said matched permissible permissions in the customer journey store is designated as non-permissible to the user of the application.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The methods of the present disclosure may be practiced using a cloud computing environment. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 11, illustrative cloud computing environment 50 is depicted. As shown, cloud computing environment 50 includes one or more cloud computing nodes 51 with which local computing devices used by cloud consumers, such as, for example, mobile and/or wearable electronic devices 54A, desktop computer 54B, laptop computer 54C, and/or automobile computer system 54N may communicate. Nodes 110 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 51 and cloud computing environment 50 can communicate with any type of computerized device over any type of network and/or network addressable connection (e.g., using a web browser).

Referring now to FIG. 12, a set of functional abstraction layers provided by cloud computing environment 50 (FIG. 1) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and permission management system 100, which is described with reference to FIGS. 1-6.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

Having described preferred embodiments of a permission management system, it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for managing the scope of permissions granted by users to application comprising:
   collecting a set of permissions for an application from an application provider publication;
   collecting a process flow for functional steps of the application from a review of the application that is published on a product review type publication, wherein the product review type publication is a diary type blog from the users on a social media type web page;
   dividing the functional steps of the application into a plurality of journeys, each of said plurality of journeys having a function associated with a stage of a functional step from a perspective of the users and a time period for performing the functional step;
   matching permissions from the set of permissions for each journey of said plurality of journeys to provide matched permissible permissions to journeys stored in a customer journey store, wherein permissions matched to each journey are correlated to the time period for performing the functional step for each journey; and
   monitoring a running application for a user using the matched permissible permissions to the plurality of journeys stored in the customer journey store, wherein an execution of a permission by the running application that is not correlated to said matched permissible permissions in the customer journey store including the permissions matched to each journey that are correlated to the time period for performing the functional step for each journey is designated as non-permissible to the user of the application.

2. The computer-implemented method of claim 1, wherein the application functions to provide transportation services.

3. The computer-implemented method of claim 1, wherein extracting the permissions comprises parsing permissions from an introduction describing the application using a web crawler and natural language processing.

4. The computer-implemented method of claim 1, wherein said dividing the functional steps of the application into the plurality of journeys considers a pool of historical user interactions with applications.

5. The computer-implemented method of claim 1, wherein said matching permissions for each journey to said plurality of journeys includes applying a matching engine using artificial intelligence.

6. The computer-implemented method of claim 1, wherein said being designated as non-permissible to the user includes sending a notification to the display of a device running the application and being operated by the user.

7. A system for managing the scope of permissions granted by users to application comprising:
a hardware processor; and
a memory that stores a computer program product, which, when executed by the hardware processor, causes the hardware processor to:
collect a set of permissions for an application from an application provider publication;
collect a process flow for functional steps of the application from a review of the application that is published on a product review type publication, wherein the product review type publication is a diary type blog from the users on a social media type web page;
divide functional steps of the application into a plurality of journeys, each of said plurality of journeys having a function associated with a stage of a functional step from a perspective of the users and a time period for performing the functional step;
match permissions from the set of permissions for each journey of said plurality of journeys to provide matched permissible permissions to journeys stored in a customer journey store, wherein permissions matched to each journey are correlated to the time period for performing the functional step; and
monitor a running application for a user using the matched permissible permissions to the plurality of journeys stored in the customer journey store, wherein an execution of a permission by the running application that is not correlated to said matched permissible permissions in the customer journey store including the permissions matched to each journey that are correlated to the time period for performing the functional step for each journey is designated as non-permissible to the users of the application;
monitoring a running application for a user using the matched permissible permissions to the plurality of journeys stored in the customer journey store, wherein an execution of a permission by the running application that is not correlated to said matched permissible permissions in the customer journey store including the permissions matched to each journey that are correlated to the time period for performing the functional step for each journey is designated as non-permissible to the user of the application.

8. The system of claim 7, wherein the application functions to provide transportation services.

9. The system of claim 7, wherein the to collect the permissions comprises parsing permissions from an introduction describing the application using a web crawler and natural language processing.

10. The system of claim 7, wherein the divide the functional steps of the application into the plurality of journeys considers a pool of historical user interactions with applications.

11. The system of claim 7, wherein the match permissions for each journey to said plurality of journeys includes applying a matching engine using artificial intelligence.

12. The system of claim 7, wherein said being designated as non-permissible to the user includes sending a notification to the display of a device running the application and being operated by the user.

13. A computer program product for managing the scope of permissions granted by users to an application, the computer program product comprising a computer readable storage medium having computer readable program code embodied therewith, the program instructions executable by a processor to cause the processor to: collect, using the processor, a set of permissions for an application from an application provider publication;
collect, using the processor, a process flow for functional steps of the application from a review of the application that is published on a product review type publication, wherein the product review type publication is a diary type blog from the users on a social media type web page;
divide, using the processor, the functional steps of the application into a plurality of journeys, each of said plurality of journeys having a function associated with a stage of a functional step and a time period for performing the functional step from a perspective of the users;
match, using the processor, permissions from the set of permissions for each journey of said plurality of journeys to provide matched permissible permissions to journeys stored in a customer journey store, wherein permissions matched to each journey are correlated to the time period for performing the functional step; and
monitor, using the processor, a running application for a user using the matched permissible permissions to the plurality of journeys stored in the customer journey store, wherein an execution of a permission by the running application that is not correlated to said matched permissible permissions in the customer journey store including the permissions matched to each journey that are correlated to the time period for performing the functional step for each journey is designated as non-permissible to the user of the application.

14. The computer program product of claim 13, wherein the application functions to provide transportation services.

* * * * *